UNITED STATES PATENT OFFICE.

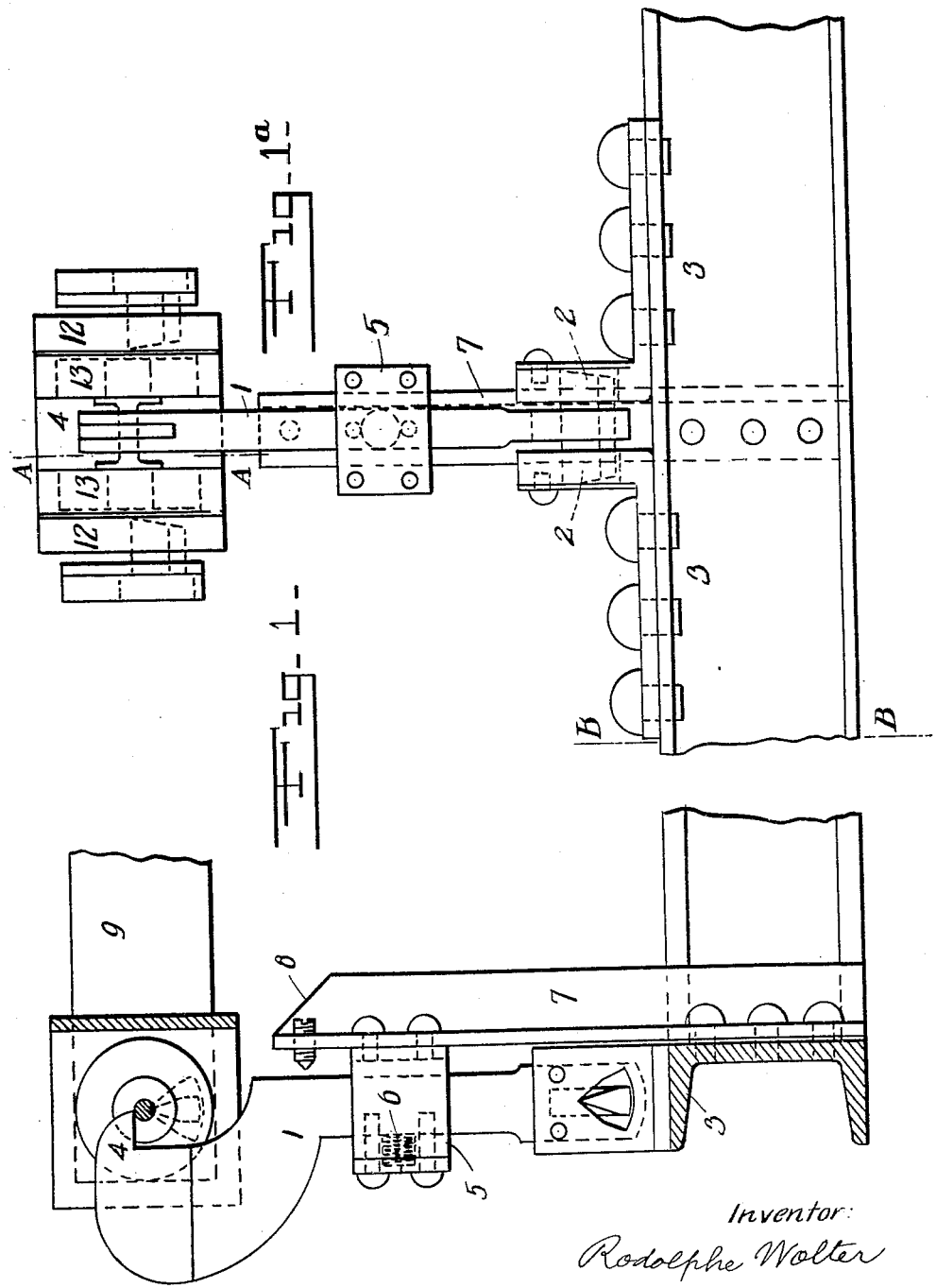

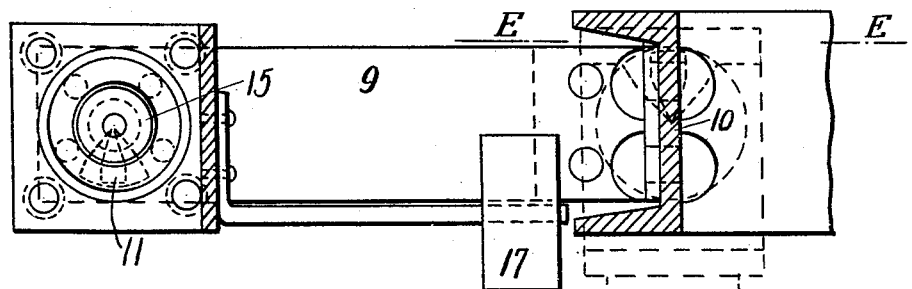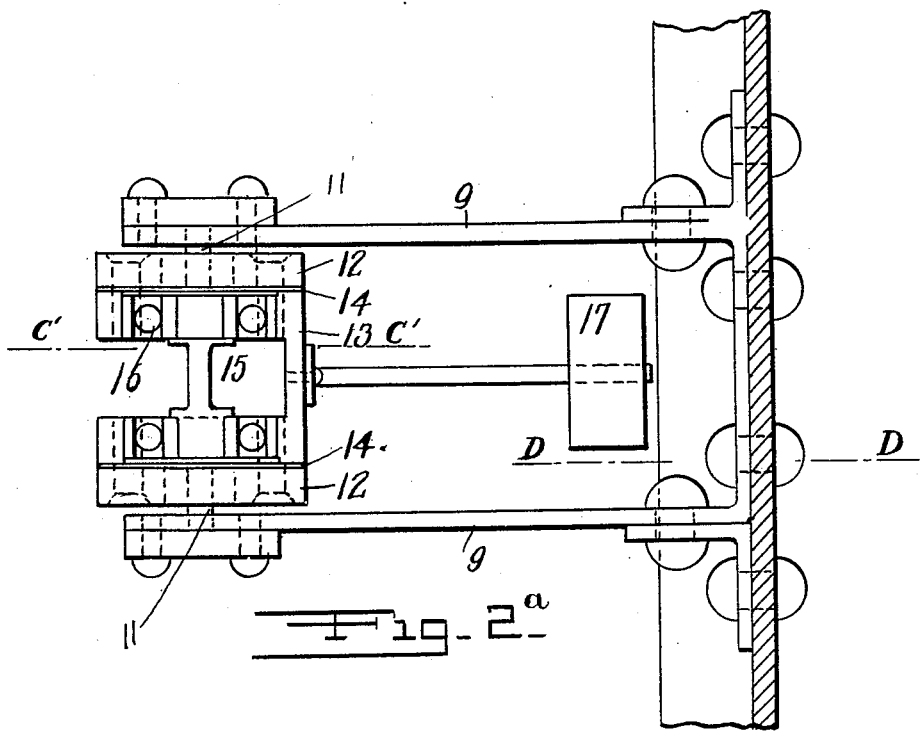

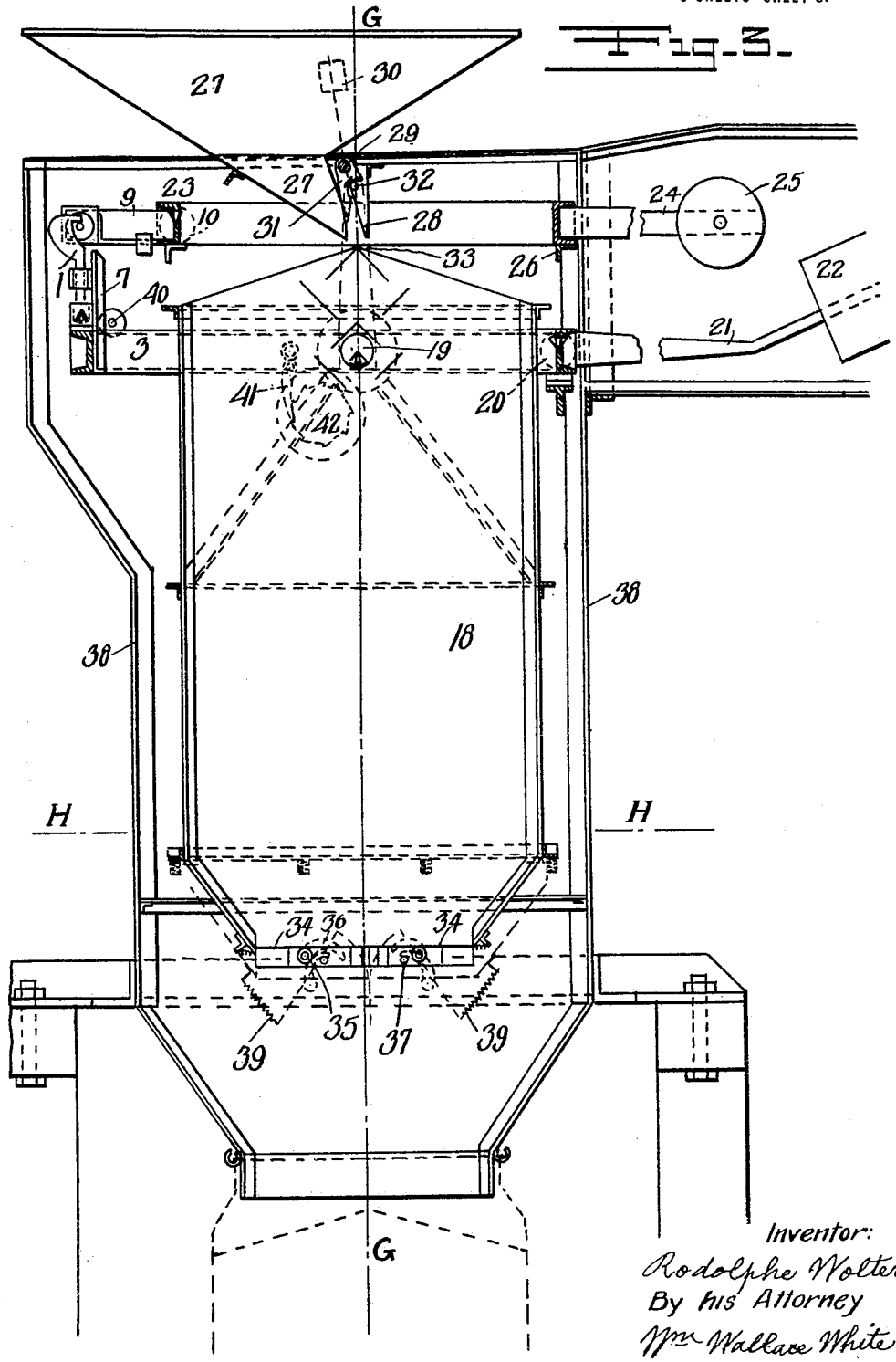

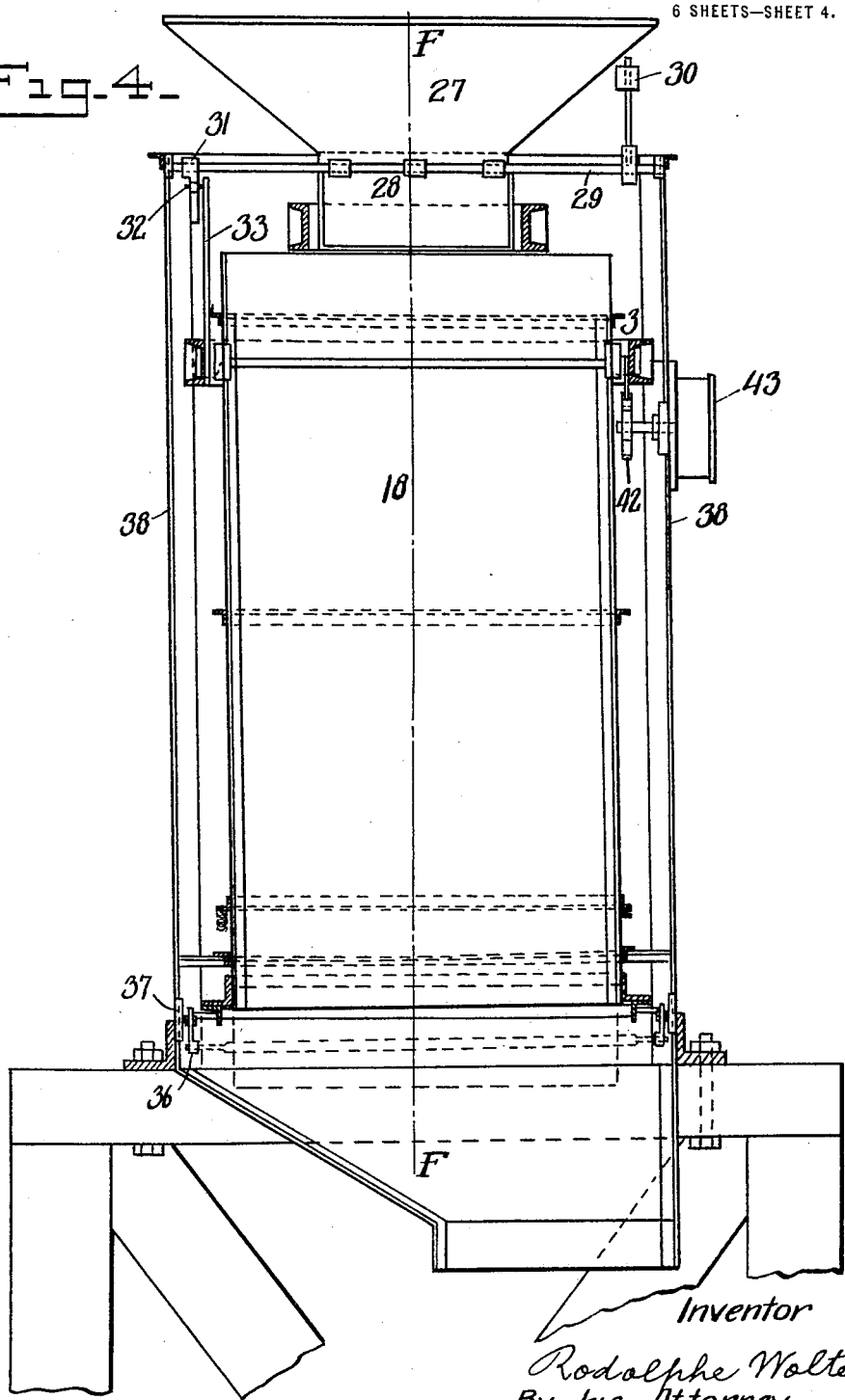

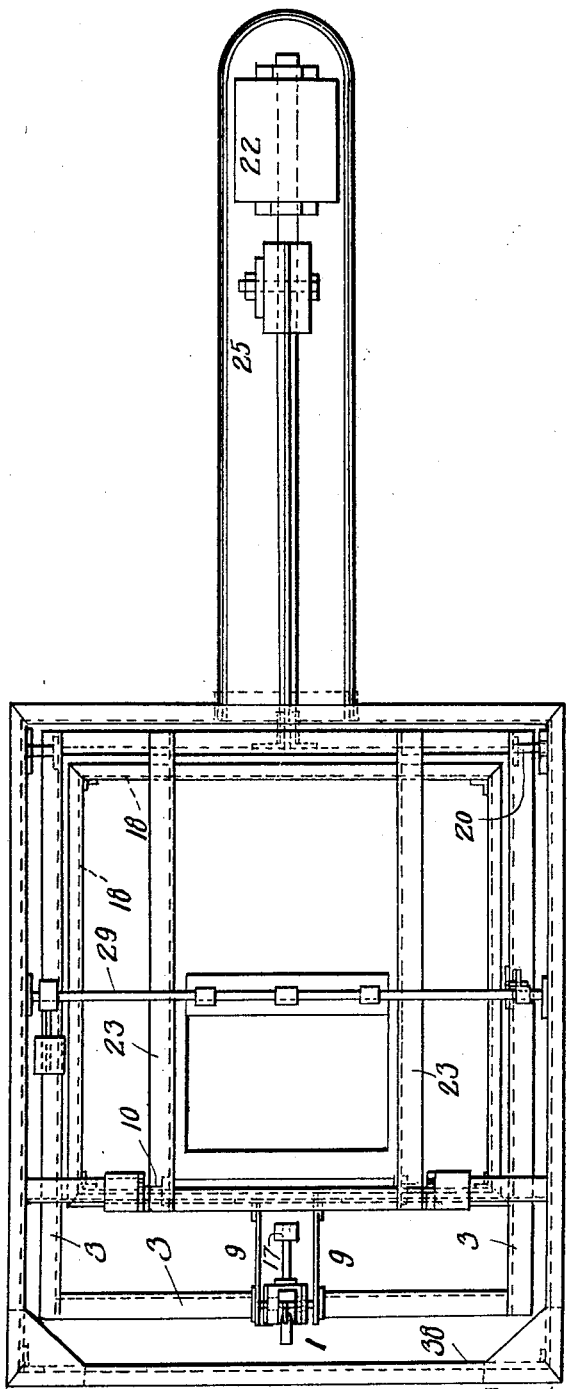

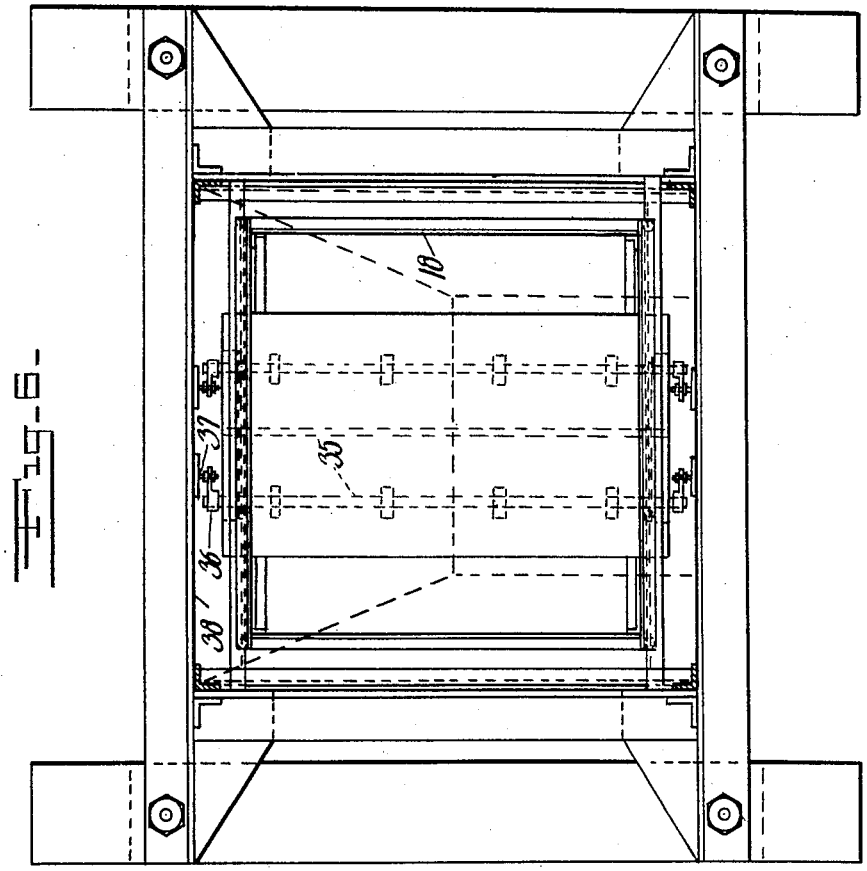

RODOLPHE WOLTER, OF BUENOS AIRES, ARGENTINA.

WEIGHING-SCALE.

1,398,480.

Specification of Letters Patent.   Patented Nov. 29, 1921.

Application filed January 20, 1920.   Serial No. 352,914.

*To all whom it may concern:*

Be it known that I, RODOLPHE WOLTER, citizen of the United States, residing at 1535 Lavalle St., Buenos Aires, Argentina, and accidentally, at Marseille, France, have invented certain new and useful Improvements in Weighing-Scales, of which the following is a specification.

This invention relates to an apparatus which applied to any scale or ordinary weighing device, allows of exactly weighing, dividing into fractions and registering any material in motion, without interrupting the feed or arrival of the same.

In the accompanying drawings, an embodiment of the said apparatus has been shown, as well as a particular manner of applying the same to the discharge end of a machine intended for dealing with grain, coffee, rice and the like.

By means of an ordinary scale, or a weighing apparatus of the type called automatic, only materials at rest can be weighed, that is to say, at the instant of approaching the weight desired, the arrival or feed of the material must be gradually stopped. For that purpose, it will be sufficient to place above the said scale a suitable vessel or hopper through which the material is caused to pass before falling onto the scale, the said hopper being provided, say at its bottom, with a discharge door or valve adapted to be closed by a mechanical operation when the scale descends; at this moment, the weighed material is withdrawn from the scale, the scale plate or platform rises to its initial position and by means of the same mechanism or any other device, the door or valve of the hopper is opened again, this latter having meantime become filled and its capacity being sufficient for containing the material fed in during the descent and the rise of the scale, after which the same operation is repeated.

Such devices as applied to a variety of apparatus, mainly North American toys, yield no satisfactory results, that is, the weight registered is not exact and this is the reason which prevented the use of weighing apparatus for automatically dividing into fractions and weighing materials in motion, without the aid of man, such as is the case when bagging sugar, rice, wheat, corn and the like in bags of the same weight, at the discharge outlet of the machines dealing with said materials; on the other hand, the difficulty is readily explained, for when the scale descends, as its contents or the material supported thereby is at this moment balanced by the counterweight of its upper beam and its plate is rigidly connected to said beam, it follows that the descending movement is of relatively short duration and, whatever device is employed in the scale for stopping at this instant the arrival or feed of the material to be weighed, it will not be able to perform this operation at a speed sufficient to permit of the weight being always equal and exact, the speedier the motion of the material, the less accurate, as occurs for instance in connection with the grain discharged by grain threshing and shelling machines, wherein the grain is discharged at a speed varying from 1 to 2 and 3 kilos per second.

Now, in order to overcome the above drawbacks, it is necessary:

1. That when the scale descends, that is, at the precise instant in which the material attains the desired weight, the container holding the same shall be independent of its balancing beam, so that on being left free, the same will fall at great speed and will close, also very speedily, by means of any suitable device, the door or valve through which the product to be weighed is being fed.

2. That said movement shall be performed within a minimum of time;

3. That after the weighed contents have been withdrawn from the scale, this latter shall at once be caused to return, either automatically or otherwise, to its original position and connect again to its balancing beam.

By the apparatus which I have invented, the above points are satisfactorily solved and said apparatus may conveniently be applied to any scale or weighing apparatus for automatically weighing materials in motion.

All of the automatic movements above referred to are performed by means of the constructional features and combinations of parts of which I claim the invention as well as of the apparatus as a whole, as will particularly be pointed out in the final claims hereunto annexed.

In the accompanying drawings, Figure 1 is a side elevation, on an enlarged scale, of a portion of a weighing apparatus embodying the invention, the view being partly in section approximately on line A—A of Fig. 1ᵃ;

Fig. 1ª is an end elevation of the structure shown in Fig. 1;

Fig. 2 is a sectional view taken approximately on the line C—C' of Fig. 2ª;

Fig. 2ª is a plan view of Fig. 2, partly in section on the line E—E of said Fig. 2. In Fig. 1, a device to be provided on the upper end of the scale beam is shown, being formed by a rocking shaft which operates in connection with knife and a wheel, independent of the vertical bar. Figs. 3, 4, 5 and 6 illustrate the invention as applied to an apparatus for weighing grain, ore or like products, and show the manner of counterbalancing the scale or container which receives the material to be weighed, and the manner of performing its descent as soon as the material contained therein or placed on the same attains the desired weight; said views further show the device for instantaneously intercepting the feed of the material.

Fig. 3 is a side elevation, partly in section, on the line F—F of Fig. 4;

Fig. 4 is a view taken at right-angles to Fig. 3, partly in section on the line G—G of said Fig. 3;

Fig. 5 is a plan view of the weighing apparatus, with the hopper and cover plate removed; and Fig. 6 is a plan view, partly in section on the line H—H of Fig. 3.

The apparatus generally, adapted to be applied to scales or weighing apparatus of any description, comprises a vertical oscillatory pointed bar 1 (Fig. 1) of steel, wood or like material, having at its lower end a knife edge shaft 2, adapted to freely oscillate in its bearings fixed to the frame 3 which supports the plate or container of the scale. This oscillatory bar replaces the vertical standard or bar of the ordinary scales. As may be seen in the full size drawing, said bar is very short so as to occupy the least possible space for its particular use in connection with a weighing device which instead of a scale plate, is provided with a receptacle or container for the reception of the material to be weighed. The bar 1 is provided at its upper end with a hook having a flat, horizontally disposed lower surface, as indicated by 4. This bar is guided, intermediate its ends, by a square frame 5 which surrounds the bar at its four sides, leaving sufficient clearance in order not to interfere with the weighing operation. One of the four sides of the said frame 5 is provided with a spring 6 which bears against the bar 1 only when the latter oscillates toward the left of the vertical position seen in Figs. 1 and 3. The frame 5 is supported by a vertical bar 7 of any suitable form (in the drawing a bar of L iron is shown) secured to the general frame 3 of the scale or container. Said bar carries at its upper end a screw 8, adjusted so as to limit the forward oscillatory movement of the bar 1. The end of the upper counterbalanced beam of ordinary scales on which is usually mounted the vertical bar that connects the same to the lower scale plate or platform, consists in the present case of a U-shaped member 9, shown most clearly in Fig. 2ª, secured to the main frame of the beam, which latter oscillates on its knife-edge pivots 10. To the ends of said U-shaped member are fixed two knife edge studs 11, on which oscillate two steel plates 12, secured by means of screws to a U-shaped member or yoke 13; on each side, between 12 and 13, there is a small thin plate 14. In the yoke 13 rotates a small wheel 15, the axis of which corresponds exactly with the axis of the studs 11. The wheel 15 rotates freely within the yoke 13, or rather on the balls 16, shown in the plan view Fig. 2ª; the diameter of the said wheel will be as small as practicable. A small counterweight 17, the distance of which may be graduated, as well as its weight, is conveniently secured to the U shaped yoke 13.

I shall now proceed to explain the operation of the apparatus, as applied to a scale for weighing grain, coffee or the like and shown in Figs. 3, 4, 5 and 6 which also illustrate certain attachments intended to render the operation of the apparatus even more exact.

The weighing apparatus as shown, comprises a container or receiver 18, in place of the usual plate or platform of an ordinary scale, which oscillates on a pair of knife-edge trunnions 19 in the interior of the frame 3, which latter is in turn provided with a pair of similar trunnions 20. At the middle of the frame, at one side, is mounted the pointed oscillatory bar 1 and other attachments of the apparatus, and at the opposite side, also at the middle, is secured a bar 21 bearing the counterweight 22. The structure thus formed corresponds to the lower part of a scale with its vertical bar or standard, but having a counterweight to balance the structure.

Above the receiver 18 is mounted the scale beam, similar to that used in connection with ordinary scales, but having its axis in the same plane as the receiver, instead of at right angles thereto, as is the case in ordinary scales. This arrangement allows of reducing to a minimum the space required. The scale beam consists of a frame 23, oscillating on its knife edge pivots or trunnions 10. At the middle of one of its sides is secured the U shaped member 9 carrying the knife-edge studs 11 and the wheel 15, as already described. At the middle of the opposite side of the frame 23 is secured the bar 24 which forms the beam proper of the scale, provided with the weight 25, which may be changed at will; this beam may be graduated or not, and provided or not with the slidable needle, in common use in scales. The structure forming the beam rests on the supporting bar 26. The material to be weighed is fed through the middle of the frame 23, passing through the hopper 27, which is entirely independent of the frame, and provided with a valve or door 28, secured to the rod or shaft 29 to swing when the latter is rotated and by means of which the flow of the material may be stopped or intercepted. The shaft 29 carries at one of its ends a counterweight 30, adapted to be adjusted at will, and on the opposite end thereof is secured an eccentric cam 31. For rocking the shaft 29 in one direction or the other, thereby to close or open the door 28 of the hopper, a vertical rod 33 is secured to the frame 3, and carries at its upper end a stud on which is mounted for rotation a roller 32, which contacts with the cam 31, so that when the frame 3 descends the roller, on coming into contact with the eccentric or cam, will rock the shaft 29 and close the door, while, when the frame 3 with its receiver rises, the said door will be opened. Suppose the material to be weighed is being fed through the hopper 27, the receiver shows a tendency to oscillate toward the left in the drawing; the oscillatory bar 1, which supports the frame of the receiver by its trunnions 19 bears then with its hooks 4 on the wheel 15, which, by means of the U shaped yoke 13 and the pivots 11, transfers the strain exerted by the weight to a mathematic distance from the knives 10 of the upper beam which acts as a counterweight. As soon as the material which falls into the receiver attains a predetermined weight, corresponding to the counterweight of the beam, the whole system will be balanced. Until this moment, the spring 6 of the bar 1 has not operated, that is, it has not touched this bar and neither has the screw 8 nor the frame 5 which surrounds the bar; this means that the said bar is entirely free and mathematically transfers the strain of the receiver below to the beam at the top, since its hook 4 which still is at rest on the movable wheel (which is necessary to its releasing and connecting movement), transfers its strain along a line at mathematic distance from the pivots 10 which support the beam, and the movable wheel in the U shaped yoke will oscillate by means of the plates 12, on the pivots 11, situated at a fixed distance from the pivots 10. At this moment, the entire system is balanced and the structure will be caused to speedily oscillate, so as to intercept as quickly as possible the flow of the material to be weighed. A slight excess of material will destroy the equilibrium and the structure will at once incline toward the left in the drawing, the part comprising the receiver will oscillate on its pivots 20, and that of the beam, on its pivots 10. The bar 1 will continue to rest on the small wheel 15 and will not release the same as it inclines toward the right, by oscillating on its lower pivots 2. At this moment, the screw 8 of the bar 7 will enter into action. The oscillatory bar 1 will bear against said screw, so that the bar will be prevented from further oscillating on its pivot 2, and its hook 4 from following the direction of the wheel 15. Said hook will therefore slide on the wheel, causing the same to rotate, and will then leave it. The smaller the diameter of said wheel and the nearer the screw 8 is situated to the oscillatory bar the sooner such action will take place. The entire structure carrying the receiver with the weight supported thereby, being free, will at once oscillate on its main pivots 20, carrying along with it the rod 33 and its roller 32 which will act on the cam 31 and close with great speed the door or valve through which the said material is being fed. The receiver is emptied by discharging its contents by the opening of two doors 34 provided at the bottom thereof and mounted on two axles 35, which may be operated either manually or automatically by the eccentric arms 36 as shown in the drawings. As the receiver descends, the arms 36 will strike against four detents 37, secured to the main housing of the apparatus, indicated at 38, (see Fig. 6) so that the doors will be opened and the contents discharged from the receiver. Both of the doors are provided with springs 39 which normally tend to close the same. The receiver having been emptied, it will at once return to its original position, owing to the action of its counterweight 22. As the oscillatory bar 1 rises, it will strike with the top of its hook 4 against the lower part of the wheel 15, incline toward the left against the action of the spring 6 and will pass a little above the said wheel and will then descend and bear again on the same, with the lower part of its hook. In order that this movement may be performed as exactly as possible the ascending force of the receiver and connected parts is adjusted, as will later be explained, so that when rising, it will pass a little above its horizontal plane of equilibrium. During this time and about at the moment in which the hook 4 of the bar comes in contact with the wheel 15, the rod 33 will, by means of its roller 32, have acted on the cam 31 and opened the gate 28 of the hopper, and the entire device will start to repeat the above operation.

It should be noted that the wheel 15 might be situated at a higher or a lower level than that of the axis of the pivots 11, the two ends of its axle being always in the same vertical line with the axis of said pivots, but in that case, the bar 1 when rising, would cause the entire system of the wheel 15 to strongly oscillate and the operation might then fail, that is, the tongue or hook 4 might fail to contact with the wheel when returning to its original position.

As the oscillatory bar 1 begins to bear on the wheel, the structure 12 and 13 will gradually incline on the pivots 11 toward the right in the drawings; this might interfere with the exact operation of the apparatus as well as with the necessary invariability of the distances of the several pivots one from another. Now, in order that at the moment of attaining the desired weight, that is, at the instant of oscillation, the structure shall occupy a more or less vertical position, the weight and the position of the counterweighted bar 17 which determines the operation, is so adjusted that the said structure 12, 13 and the small wheel 15 will assume a more or less vertical position at this moment. It follows therefore that when commencing to fill the receiver, the entire structure will be inclined toward the left and will gradually turn to the erect position as the scale or receiver receives its charge and will finally assume a vertical position at the instant in which the scale has received about the weight to be attained, that is, at the moment of oscillation of the apparatus when all of its parts are to occupy their respective positions as exactly as possible.

The operation of the above described apparatus, adapted to be applied to any kind of scale or weighing apparatus, will be rendered even more exact by means of the arrangements or attachments now to be described.

By raising the counterweight 22 which corresponds to the scale of an ordinary balance, above the horizontal plane passing through the pivots 19 and 20, so as to sufficiently raise the center of gravity of the system above said horizontal plane, a crank scale is formed. In the above described arrangement of the beam, the axis and the weight 25, on the other hand, are situated nearly in the same plane as the pivots 10 and 11, so that the structure, when about to oscillate, constitutes a scale in perfect equilibrium, but nearly unstable, with its center of gravity below, but as near as possible to the plane of its pivots.

It follows that at the moment of destroying the equilibrium, that is, when the desired weight has fallen on the scale or into the receiver, only the part comprising the upper beam will oppose resistance to the descent, while the structure carrying the receiver will on the other hand, accelerate the descent, its center of gravity being in a vertical plane over its supporting pivots. By means of this arrangement of crank scale, I am enabled to accelerate the descending motion, that is, to increase the speed with which the feed doors are closed for the material to be weighed, which closure can only be performed after attaining the desired weight or when the apparatus commences to oscillate, so as not to influence the accuracy of the weighings. In order to cause the receiver to rise by itself, after being emptied, it will be necessary only to displace the counterweight toward the right of the pivots 20, as shown in the drawings, to impart to the same the necessary rising impulse. It will of course be seen that the entire receiver structure, after its rise, will no longer be balanced and instead of stopping at the horizontal plane, it will tend to rise beyond the same. This rise will be stopped by the detent 40. This will also enable the hook of the oscillatory bar 1 to pass above the small wheel 15, so as to finally come to rest on the same. The structure comprising the receiver will not assume a horizontal position and in consequence, the hook of the oscillatory bar will bear again on the wheel 15 only when a weight has fallen into the receiver sufficient to just counterbalance the rise of the main counterweight 22, that is to say, equal to the rising impulse to be obtained by the displacement of said counterweight. This weight is to be taken into account when determining the counterweight of the upper beam and which, in consequence, will decrease in proportion. On the other hand, this force or impulse may be decreased until eliminated altogether or until the initial position of the counterweight 22 is reached or, which is the same thing, until the counterweight is left in its first position of horizontal equilibrium of the receiver, by means of the springs 39 of its lower doors which, when acting to close the latter, move in an upward direction.

It will be seen that I have arranged the scale structure of the receiver as a crank scale. This may not be done with the upper beam structure, as in that case the oscillatory movements of the scale when the desired weight is reached, would be accelerated still more, as in such case the entire apparatus would be loose or crank, with the result that any shaking at the approach of the general equilibrium of the scale or balance, would cause the same to oscillate either before or after the exact moment.

For the purpose of obtaining exact weighings, the receiver is situated as close as possible to the hopper, leaving only the necessary clearance, and in order to always maintain the same in a vertical position, suitable inclined surfaces or planes have been arranged in its interior which guide the material toward its center.

The admission or feeding door is closed by means of the eccentric or cam 31, as before explained. This cam is provided with a recess at its center which is engaged by the roller 32, connected to the vertical rod 33 of the frame of the container. The roller bears on the eccentric or cam immediately after the oscillatory bar 1 leaves its wheel 15, and causes the cam to rock and with it, the door secured to its axle, thereby closing said door. The roller will continue to bear on the cam until the end of the general descending motion, although the door has already been closed, in order to cause the latter to remain in such tightly closed position during all the time which may be required. Without such arrangement, though the door was held in its closed position by means of a counterweight, such as 30 (which from the left has passed to the right of the vertical and holds the door applied against its frame), the door would vibrate and such vibration would not allow of a sufficiently tight closure and some of the material to be weighed would continue to pass during the descent of the scale. It is therefore necessary to provide the eccentric or cam with an extension at its lower part, as shown in the drawing, so that the roller 32 will continue its engagement with the same until the descending movement has entirely been completed. The receiver having attained its lowermost position and being at rest, there will be no more vibrations and the counterweight 30, though rather small, will be sufficient to keep the door well closed and the receiver will be able to readily rise again without the cam 31 having to exert any force on the roller 32 which might retard the rise thereof.

For the purpose of recording or registering the weighings a jointed finger 41 has been provided on the frame 3 of the receiver which when the oscillatory bar 1 has left its wheel 15, will start the rotation of a toothed wheel 42, mounted directly on the axle of a counter 43 which records or registers the number of weighings effected. Suitable tables may be used to indicate the amount of kilos corresponding to the number of weighings indicated by the counter and to the weights secured to the beam by means of bolts or any other suitable device.

The housing or casing of the weighing apparatus rests on a suitable support of wood or other material, its top being provided with a cover adapted to be sealed by means of a lead seal, so as to prevent the apparatus from being tampered with during operation.

I now declare that what I claim as new and desire to secure by Letters Patent, is:

1. A weighing apparatus, comprising, in combination, a balancing beam, a receptacle movable vertically relative to said beam, means for supplying material to be weighed to said receptacle, means for temporarily suspending said receptacle from the beam and automatically releasable when the contents of the receptacle have reached a predetermined weight, and means for automatically shutting off the supply of material upon release of said suspending means.

2. A weighing apparatus, comprising, in combination, a balancing beam, a receptacle movable vertically relative to said beam, means for supplying material to said receptacle, means for temporarily suspending said receptacle from the beam and automatically releasable when the contents of the receptacle have reached a predetermined weight, means for automatically shutting off the supply of material upon release of said suspending means, means for automatically discharging the contents of said receptacle after its release from said beam, and means for automatically returning said receptacle to suspended position.

3. A weighing apparatus, comprising, in combination, a pivotally mounted balancing beam, a frame pivotally mounted below said beam, a receptacle pivotally mounted in said frame, a coöperating means carried by said beam and frame for temporarily connecting them for pivotal movement together and automatically releasable during such pivotal movement, means for supplying material to be weighed to said receptacle, thereby to swing said frame and beam on their pivots when the contents of the receptacle have reached a predetermined weight, means carried by the frame for shutting off the supply of material during such pivotal movement.

4. A weighing apparatus, comprising, in combination, a pivotally mounted balancing beam, a frame pivotally mounted below said beam, a receptacle pivotally mounted in said frame, coöperating means carried by said beam and frame for temporarily connecting them for pivotal movement together and automatically releasable during such pivotal movement, means for supplying material to be weighed to said receptacle, thereby to swing said frame and beam on their pivots when the contents of the receptacle have reached a predetermined weight, means carried by the frame for shutting off the supply of material during such pivotal movement, means for automatically discharging the contents of said receptacle during the swinging movement of the frame.

5. A weighing apparatus, comprising, in combination, a pivotally mounted balancing beam, a frame pivotally mounted below said beam, a receptacle pivotally mounted in said frame, coöperating means carried by said beam and frame for temporarily connecting them for pivotal movement together and automatically releasable during such pivotal movement, means for supplying material to be weighed to said receptacle, thereby to swing said frame and beam on their pivots when the contents of the receptacle have reached a predetermined weight, means carried by the frame for shutting off the supply of material during such pivotal movement, means for automatically discharging the contents of said receptacle during the swinging movement of the frame, and means for automatically swinging said frame on its pivot in the opposite direction after the discharge of its contents, thereby to cause the reëngagement of said frame and beam and reëstablish communication between the receptacle and the supplying means.

In testimony whereof I affix my signature in the presence of two witnesses.

RODOLPHE WOLTER.

Witnesses:
YVONNE WOLTER,
F. BOBAY.